United States Patent
Lilie et al.

(10) Patent No.: US 10,227,975 B2
(45) Date of Patent: Mar. 12, 2019

(54) GAS DISCHARGE SYSTEM FOR A REFRIGERATION COMPRESSOR AND A REFRIGERATION COMPRESSOR

(71) Applicant: Whirlpool S.A., São Paulo-Sp (BR)

(72) Inventors: Dietmar Erich Bernhard Lilie, Joinville-Sc (BR); Talita Wajczyk, Joinville-Sc (BR)

(73) Assignee: Whirlpool S.A., Sao Paulo-SP (BR)

( * ) Notice: Subject to any disclaimer, the term of this patent is extended or adjusted under 35 U.S.C. 154(b) by 435 days.

(21) Appl. No.: 14/432,883

(22) PCT Filed: Aug. 2, 2013

(86) PCT No.: PCT/BR2013/000393
§ 371 (c)(1),
(2) Date: Apr. 1, 2015

(87) PCT Pub. No.: WO2014/053039
PCT Pub. Date: Apr. 10, 2014

(65) Prior Publication Data
US 2015/0275884 A1    Oct. 1, 2015

(30) Foreign Application Priority Data
Oct. 3, 2012    (BR) .......................... 1020120252791

(51) Int. Cl.
*F04B 53/10*    (2006.01)
*F04B 53/00*    (2006.01)
(Continued)

(52) U.S. Cl.
CPC ...... *F04B 53/1085* (2013.01); *F04B 39/0027* (2013.01); *F04B 39/0055* (2013.01);
(Continued)

(58) Field of Classification Search
CPC ...... F04B 53/007; F04B 53/16; F04B 53/162; F04B 53/10; F04B 53/1037;
(Continued)

(56) References Cited

U.S. PATENT DOCUMENTS 4,715,790 A * 12/1987 Iijima ................. F04B 27/1036
417/269
5,096,395 A *  3/1992 Todescat ............... F04B 39/102
137/543.19
(Continued)

FOREIGN PATENT DOCUMENTS

AT            8985 U1      3/2007
DE      19912926 A1      9/2000

OTHER PUBLICATIONS

International Search Report and Written Opinion, International Application No. PCT/BR2013/000393, dated Jan. 30, 2014.

*Primary Examiner* — Bryan M Lettman
(74) *Attorney, Agent, or Firm* — Harrington & Smith (57) ABSTRACT

A compressor includes a cylinder crankcase defining a cylinder which is closed by a valve plate provided with at least one discharge orifice associated with a discharge valve and defining, with the cylinder, a compression chamber; a cylinder cap seated against the valve plate and inside which is defined a discharge chamber. A portion of the cylinder cap is dimensioned to receive the entire flow of refrigerant gas released through the discharge orifice and accelerate said gas flow so as to produce an instantaneous reduction in the pressure gradient between the upstream and downstream sides of the discharge valve, in the moment the latter opens.

14 Claims, 4 Drawing Sheets

(51) Int. Cl.
*F16K 15/16* (2006.01)
*F04B 53/16* (2006.01)
*F04B 39/06* (2006.01)
*F04B 39/14* (2006.01)
*F04B 39/12* (2006.01)
*F04B 39/00* (2006.01)
*F04B 39/10* (2006.01)

(52) U.S. Cl.
CPC .......... *F04B 39/0061* (2013.01); *F04B 39/06* (2013.01); *F04B 39/064* (2013.01); *F04B 39/10* (2013.01); *F04B 39/121* (2013.01); *F04B 39/123* (2013.01); *F04B 39/125* (2013.01); *F04B 39/14* (2013.01); *F04B 53/001* (2013.01); *F04B 53/007* (2013.01); *F04B 53/1037* (2013.01); *F04B 53/16* (2013.01); *F16K 15/16* (2013.01)

(58) Field of Classification Search
CPC ................ F04B 53/1047; F04B 53/105; F04B 39/0027; F04B 39/0055; F04B 39/0061; F04B 39/0088; F04B 53/001; F04B 53/1085; F04B 53/1075; F04B 53/108; F04B 39/06; F04B 39/121; F04B 39/125; F04B 39/123; F16K 15/16
See application file for complete search history.

(56) References Cited

U.S. PATENT DOCUMENTS

| | | | |
|---|---|---|---|
| 2008/0260561 A1* | 10/2008 | Ribas | F04B 39/064 417/569 |
| 2009/0136365 A1 | 5/2009 | Zippl et al. | |
| 2010/0310389 A1* | 12/2010 | Alvarenga | F01N 1/089 417/312 |
| 2012/0063937 A1* | 3/2012 | Moreira | F04B 39/0061 417/437 |

\* cited by examiner

GAS DISCHARGE SYSTEM FOR A REFRIGERATION COMPRESSOR AND A REFRIGERATION COMPRESSOR

CROSS-REFERENCE TO RELATED APPLICATIONS

This application is the U.S. national phase of PCT/BR2013/000393 filed Aug. 2, 2013, which claims priority of Brazil Patent Application 10 2012 025279 1 filed Oct. 3, 2012, which is incorporated herein by reference.

FIELD OF THE INVENTION

The present invention refers to a gas discharge system for a refrigeration compressor, for example, of the reciprocating hermetic type, which is particularly driven by a linear motor, and to a compressor comprising said system.

BACKGROUND OF THE INVENTION

One of the sources which contribute to the loss of power and mass efficiency in compressor is the gas discharge system. In a gas discharge system in which the displacement of the one or more discharge valves is adjusted, that is, the discharge valve opens and closes in desired moments and with low oscillation, the mass efficiency is favored by eliminating or reducing the reflux, minimizing power loss due to the flow of gas through the valve.

The pressures upstream and downstream the discharge valve are some of the variables which define the operational dynamic thereof. Such variables depend on the refrigerant gas, on the operational condition of the compressor, on the design of the discharge orifice and, specially, on the construction of the discharge filter.

Improvements on the discharge filter and on the assembly defined by the discharge orifice and discharge valve, in order to reduce the restrictions imposed by said components, have a direct impact in the energy consumption and consequently in the efficiency of the compressor, particularly in the hermetic refrigeration compressors.

In the refrigeration compressors, the gas compressed by the displacement of the piston (driven by a connecting rod-crankshaft mechanism, or by a resonant spring in the linear compressor) is directly discharged in a discharge chamber usually defined in the interior of the cylinder cap. In these constructions, the gas reaching the discharge chamber undergoes a pressure reduction, spreading in a random and turbulent manner in the interior of the discharge chamber, in the valve plate region, which results in power loss.

SUMMARY OF THE INVENTION

Due to the difficulties in improving the energetic efficiency of the refrigeration compressor by means of the construction of the gas discharge system, the present invention has the objective of providing a gas discharge system in a refrigeration compressor, which is able to reduce the power loss of the compressed gas pumping system in the discharge of the compressor.

The invention has the further objective of providing a gas discharge system such as mentioned above, which reduces the pressure in the cylinder and, consequently, the discharge power, thus improving the acoustic performance of the compressor and further reducing the thermal exchange between the compressed gas and the valve plate.

Another objective of the present invention is to provide a discharge system, such as mentioned above, which is of easy construction and assembly, particularly but not exclusively, in a compressor of the type having a linear motor, further providing a stop for controlling the maximum opening of the discharge valve and, consequently, the operational dynamic of the latter.

An additional objective is to provide a refrigeration compressor including a gas discharge system, such as mentioned above.

These objectives are achieved with a gas discharge system in a refrigeration compressor of the type comprising: a cylinder crankcase defining a cylinder which is closed, at one end, by a valve plate provided with at least one discharge orifice and defining, with the cylinder, a compression chamber; a cylinder cap, having a gas outlet and being seated against the valve plate, in opposition to the compression chamber and inside which is defined a discharge chamber, the valve plate being operationally associated with at least one discharge valve.

The gas discharge system of the present invention comprises an accelerating means mounted in the interior of the discharge chamber and affixed to at least one of the parts of cylinder cap and valve plate, in order to receive the entire flow of refrigerant gas released by the discharge valve through the discharge orifice, accelerating said flow of refrigerant gas and producing an instantaneous reduction in the pressure gradient between the upstream and downstream sides of the discharge valve, upon its opening.

The construction of the present invention allows reducing the pressure transients upstream and downstream of the discharge valve, in the moment of its opening, reducing the power loss in the discharge system and the intensity of the pulsations caused by the operation of the discharge valve, further minimizing the thermal exchange between the compressed gas in the interior of the discharge chamber and the valve plate, whereby the thermal exchange in the cylinder cap region is reduced.

BRIEF DESCRIPTION OF THE DRAWINGS

The invention will be described below, with reference to the enclosed drawings, given by way of example of a possible embodiment of the invention, and in which.

DESCRIPTION OF THE INVENTION

The present invention will be described for a refrigeration compressor of the reciprocating hermetic type and comprising a motor-compressor assembly (not illustrated), including a cylinder crankcase 1 (partially illustrated in FIG. 4), which defines a cylinder 2 in whose interior a piston is axially displaced (not illustrated), through the action of a rotary or linear electric motor.

The cylinder crankcase may be constructed in any suitable metal alloy, well known in the state of the art.

The cylinder 2 has an open end, through which the piston is housed, and an opposite end (illustrated in FIG. 4), closed by a valve plate 3, against which is seated a cylinder cap 10, usually metallic, said valve plate 3 defining, with the cylinder 2, a compression chamber C. The valve plate 3 is built in metal alloy, in order to operate together with at least one suction valve, not illustrated, facing the interior of the cylinder 2, and with at least one discharge valve 4 which, in the illustrated example, takes the form of a single sheet incorporating a metallic flexible blade 4a, operating in association with a respective discharge orifice 3a of the valve plate 3. It should be understood that the discharge valve may take the form of a single sheet incorporating a plurality of flexible blades, each operating in association with a respective discharge orifice provided in the valve plate 3.

The refrigerant gas flow compressed in the interior of the compression chamber C is released from the latter, upon the opening of the discharge valve 4 by the discharge orifice 3a.

The valve plate 3 is seated on the cylinder crankcase 1, by means of an annular sealing gasket 5. Although not illustrated in the drawings, it may be further provided another annular sealing gasket located between the discharge valve 4 and the adjacent face of the valve plate 3.

In the illustrated embodiment, the annular sealing gasket is provided with at least two diametrically opposite eccentric axial projections 5a, which are dimensioned to be fitted in respective recesses 1a provided in an opposite face of the cylinder crankcase 1, thus allowing for the correct indexing in the seating of the annular sealing gasket 5 against the cylinder crankcase 1.

The cylinder cap 10 is seated against a face of the valve plate 3, opposed to that seated against the cylinder crankcase 1. The cylinder cap 10 defines, with the adjacent face of the valve plate 3, a discharge chamber 11, which maintains a selective fluid communication with the cylinder 2, through the discharge orifice 3a, upon the opening of the discharge valve 4, and a constant fluid communication with one side of the discharge of a refrigeration system to which the compressor is associated, through a discharge tube (not illustrated), which connects said discharge chamber 11 to the exterior of the compressor.

The cylinder cap 10 takes the form of a cup with its open base seated on the valve plate 3 and defining a gas inlet 12 in fluid communication with the discharge orifice 3a, and a gas outlet 13, coupled to a discharge tube which connects said gas outlet 13 to the exterior of the compressor.

In the illustrated embodiment, the cylinder cap 10 is provided with an end wall 14, opposite to its open base and to the valve plate 3. In the illustrated embodiment, the gas outlet 13 is provided in a chamfered region 15 of the end wall 14 and disposed facing laterally outwards of the cylinder cap 10. However, this positioning of the gas outlet 13 should not be limited to the illustrated construction.

According to the invention, the gas discharge system comprises an accelerating means AM mounted in the interior of the discharge chamber 11 and fixed to at least one of the parts of cylinder cap 10 an valve plate 3, in order to receive the entire flow of refrigerant gas released by the discharge valve 4 through the discharge orifice 3a, accelerating said refrigerant gas flow and producing an instantaneous reduction in the pressure gradient between the upstream and downstream sides of the discharge valve 4, in the moment of its opening.

The accelerating means AM may be defined by a tubular conduit 22b of cylindrical or inverted frusto-conical shape, which projects to the interior of the discharge chamber 11, from the discharge orifice 3a of the valve plate 3, said tubular conduit 22b being dimensioned to produce the desired acceleration in the refrigerant gas flow released by the discharge orifice 3a, in the moment the discharge valve 4 opens.

In a particular construction, the gas discharge system may comprise a base end wall 24, seated against the valve plate 3 and provided with an inlet nozzle 22 comprising a base opening 22a, open to the discharge orifice 3a of the valve plate 3 and communicating said discharge orifice 3a to the discharge chamber 11, with the tubular conduit 22b being incorporated, in a single piece, to the base end wall 24 and defining an extension of the inlet nozzle 22 to the interior of the discharge chamber 11.

The construction defined above allows the region of the base end wall 24, defined around the base opening 22a of the inlet nozzle 22, to define a stop for the maximum opening of the discharge valve 4, while the remaining of the base end wall 24 retains the discharge valve 4 in its position in the valve plate 3.

In the illustrated construction, an annular region 22c of the base wall 24, which surrounds the base opening 22a do inlet nozzle 22, is constructed so as to be axially spaced from the valve plate 3, defining an opening stop for the flexible blade 4a of the discharge valve 4. In a particular and preferred manner, said annular region 22c of the base wall 24 is provided inclined radially inward and axially inward the discharge chamber 11, defining an inclined opening stop, against which is seated the flexible blade 4a, upon the maximum opening of the discharge valve 4.

Still according to the illustrated embodiment, the tubular conduit 22b of the inlet nozzle 22 has a frusto-conical configuration, having the larger base thereof open and facing the interior of the hollow body 20. This constructive arrangement of the inlet nozzle 22 facilitates the operation of the accelerating means AM, in order to accelerate the flow of refrigerant gas released by the discharge valve and producing an instantaneous reduction in the pressure gradient between the upstream and downstream sides of the discharge valve 4, in the moment of its opening.

According to the illustrations, the cylinder cap 10 houses an acoustic discharge filter F having hollow body 20, which may be formed in a thermal insulating material, or in any other material, not necessarily thermally insulating, defining at least one plenum 21 in its interior and mounted, for example in an indexed manner, in the interior of the cylinder cap 10 maintaining, with the latter, a gap 30, and being seated against the valve plate 3, preventing the direct contact thereof with the internal volume of the hollow body 20.

The plenum 21 of the hollow body 20 effectively acts as a discharge chamber and as an element of the acoustic discharge filter F. The discharge chamber 11 of the cylinder cap 10 acts, in this embodiment, for defining the volume of the gap 30 between the inner walls of the cylinder cap 10 and the hollow body 20. The assembly of the cylinder cap 10 and hollow body 20 may be carried out in order to make the gap 30 hermetic in relation to the interior of the hollow body 20 and to the exterior of the cylinder cap 10.

In the preferred embodiment, illustrated in the drawings, the hollow body 20 of the acoustic discharge filter F is provided with the inlet nozzle 22, communicating the plenum 21 with the discharge orifice 3a of the valve plate 3, and with an outlet nozzle 23 communicating the plenum 21 with the gas outlet 13 of the cylinder cap 10.

Although not illustrated herein, the base end wall 24 may incorporate a plurality of base projections facing outwards the hollow body 20, indexing the hollow body 20 in relation to the valve plate 3 and also to the annular sealing gasket 5 and to the cylinder crankcase 1.

The hollow body 20 comprises a top end wall 25 in which is provided the outlet nozzle 23 of the hollow body 20, said outlet nozzle 23 being open to the gas outlet 13 of the cylinder cap 10.

The outlet nozzle 23 of the hollow body 20 comprises an outer tubular projection 23a which extends outwards of a lowered region 25a of the top end wall 25 of the hollow body 20, in order to be fitted in a tubular passage 16 formed internally to the end wall 14 and which is open to the outlet nozzle 13 da cylinder cap 10.

In the illustrated embodiment, the outlet nozzle 13 of the cylinder cap 10 is configured to receive and secure, in its interior, by any suitable means, such as for example, threads, adhesives or brazing, a tubular connector 18 which projects outside from the outlet nozzle 13, in order to be coupled to an adjacent end of the discharge tube, not illustrated, which connects the discharge chamber 11 to the exterior of the compressor.

The discharge system of the present invention further provides a biasing means located between the top end wall 25 of the hollow body 20 and the end wall 14 of the cylinder cap 10, in order to constantly and elastically force the hollow body 20 against the valve plate 3, minimizing the passage of the discharge gas to the interior of the cylinder cap 10, externally to the hollow body 20.

The biasing means 40 forces the base end wall 24 against the valve plate 3, enhancing the functions of securing and limiting (stop) the base end wall 24 in relation to the discharge valve 4. The biasing means 40 further improves the sealing of the hollow body 20 in relation to the gap 30.

In a non-limiting way of carrying out the present invention, the biasing means 40 is defined by a plate spring 41, usually in parallel rods and joined by their ends 41a, each being fitted externally to a respective top projection 25b of the top end wall 25 of the hollow body 20.

Although it has not been illustrated herein, the top end wall 25 of the hollow body 20 may incorporate a plurality of top projections facing outwards of the hollow body 20, and the end wall 14 of the cylinder cap 10 may be internally provided with an equal plurality of recesses, inside which is fitted a respective top projection of the top end wall 25, indexing, in relation to each other, the hollow body 20 and the cylinder cap 10. In said construction, the plate spring 41 may have each of its ends fitted inside a respective top projection of the top end wall 25.

It should be understood that the discharge system of the present invention may be carried out independently of the constructive particularities of the cylinder cap, biasing means, etc.

In the illustrated embodiment, the hollow body 20 is formed of two parts 20a, 20b, one incorporating the base end wall 24 and the other incorporating the top end wall 25, said parts being seated against a common dividing wall 26 which divides the plenum 21 of the hollow body 20 into a first and into a second discharge chamber C1, C2, said dividing wall 26 presenting an opening 26a communicating both discharge chambers C1, C2.

Although not illustrated in the drawings, it is possible to provide a sealing means between the two parts 20a, 20b of the hollow body 20 and the common dividing wall 26, which sealing means may be defined in different manners, such as for example, by an adhesive film or by sealing gaskets.

As it may be observed in FIGS. 1 and 4, the part 20a of the hollow body 20 closer to the valve plate 3 presents an end edge 28a, facing the common dividing wall 26 and provided with at least two outer notches 29a configured to perform the function described below.

Figure 1:
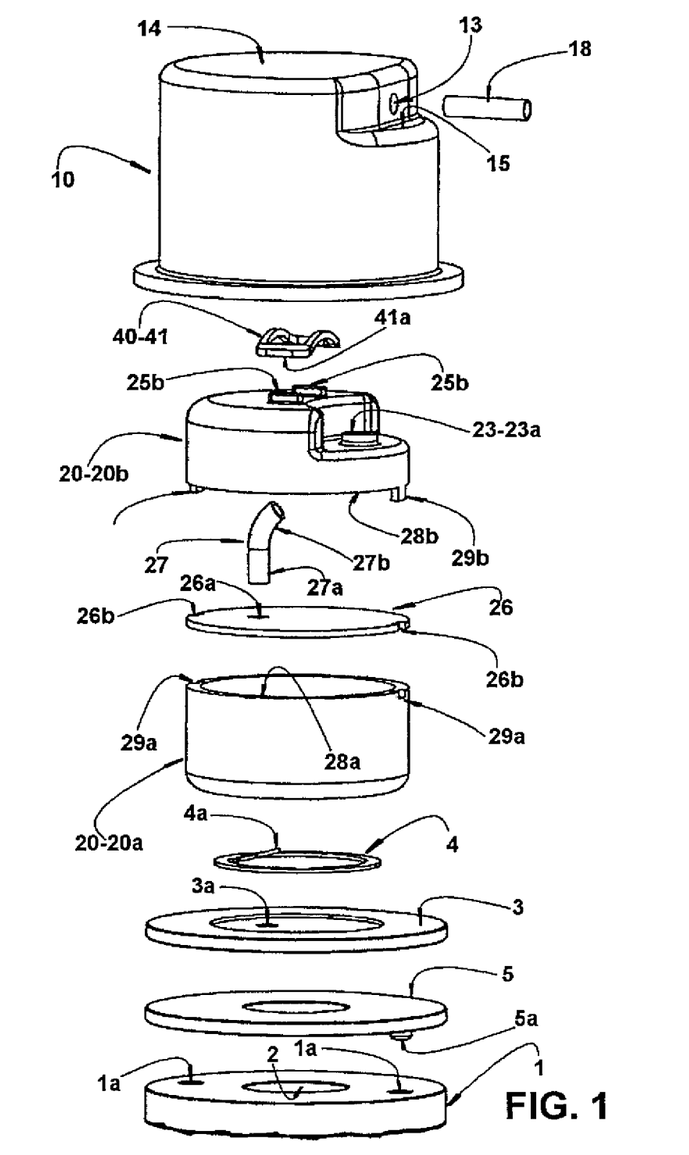
FIG. 1 represents an exploded perspective view of the assembly formed by the cylinder cap, by the hollow body in multiple parts, by a discharge valve, by the valve plate and by sealing gaskets, all built according to the subject system.
Figure 2:
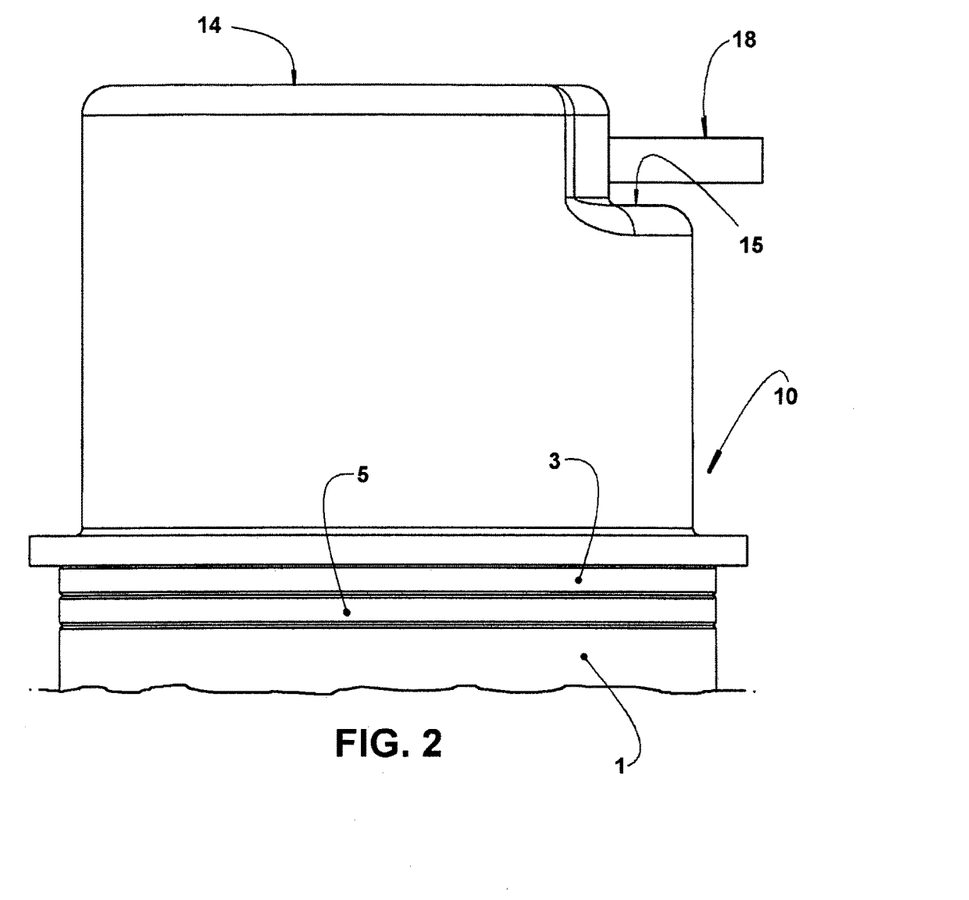
FIG. 2 represents a lateral view of the assembly illustrated in FIG. 1, with the component parts in the assembled condition.
Figure 3:
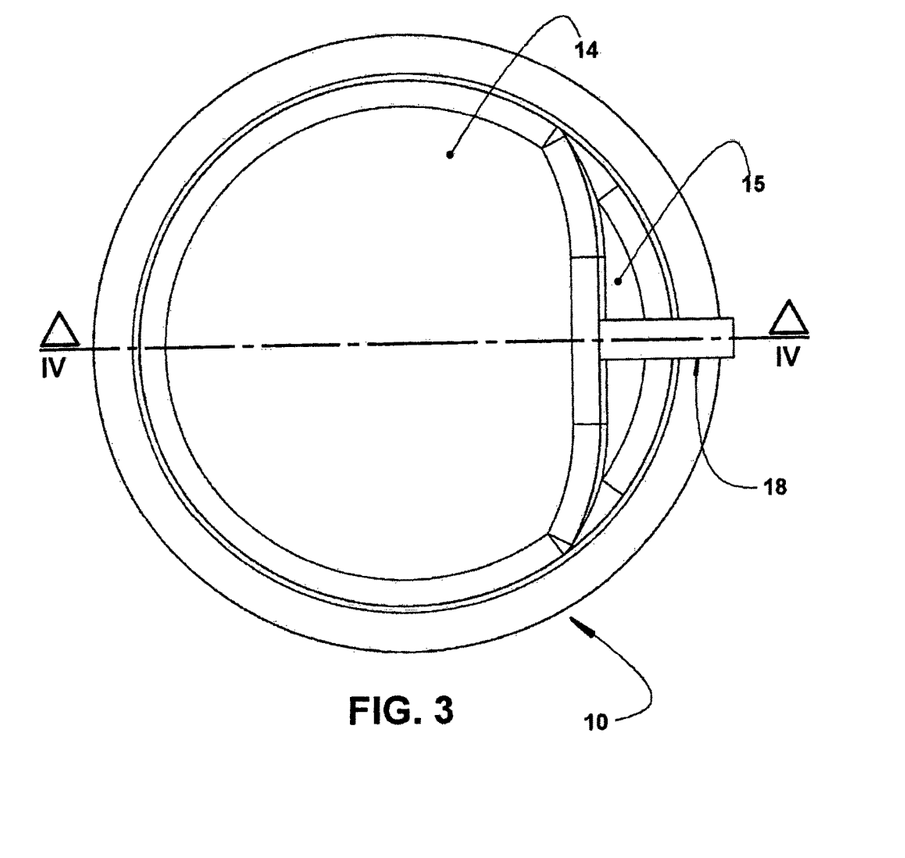
FIG. 3 represents an end view of the assembly illustrated in FIG. 2, taken from the outer end of the cylinder cap.
Figure 4:
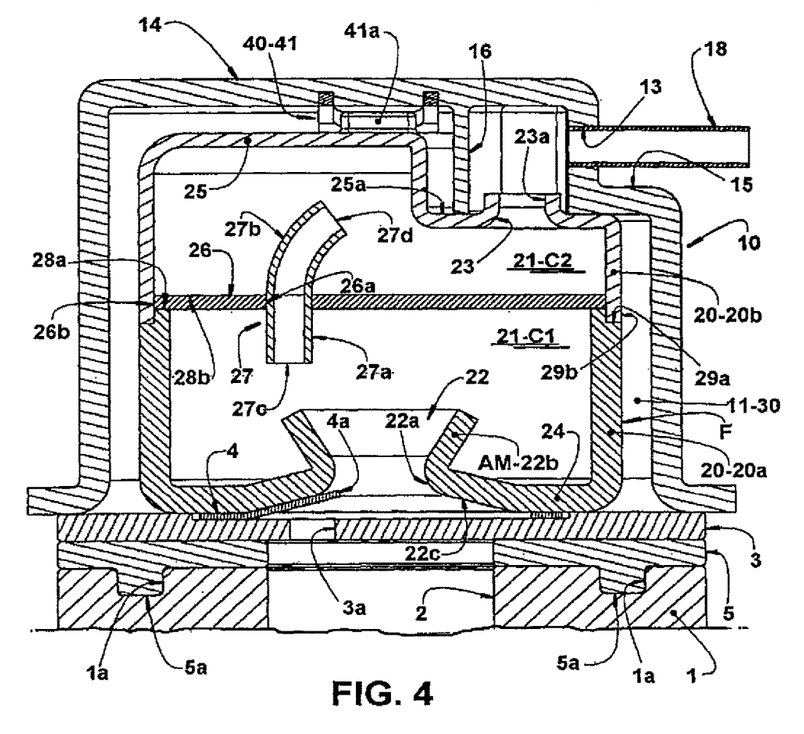
FIG. 4 represents a cross-sectional view of the assembly illustrated in FIG. 3, said cut being taken according to line IV-IV in said figure.

In the same FIGS. 1 and 4, it may observed that other part 20b of the hollow body 20 has an end edge 28b facing the common dividing wall 26 and incorporating at least two axial projections 29b dimensioned to be each fitted and preferably retained into a respective outer notch 29a of the other part 20a of the hollow body 20.

Still according to the embodiment illustrated in FIGS. 1 and 4, the common dividing wall 26 presents at least two radial notches 26b dimensioned to allow the passage of the axial projections 29b of the part 20b of the hollow body 20, upon closing the latter.

It should be understood that the hollow body 20 may be formed in a single piece defining a single discharge chamber, or also formed in two or more parts, as illustrated, however having the dividing wall incorporated to one of said parts. The hollow body 20 may further present more than two discharge chambers in the interior thereof.

In the illustrated embodiment, the opening 26a of the dividing wall 26 receives, hermetically, at least one tube 27, which projects to the interior of the first discharge chamber C1, through a straight section 27a eccentric in relation to the inlet nozzle 22 of the hollow body 20, and into the second discharge chamber C2, through an arcuate section 27b. The tube 27 may be built and dimensioned in order to define an acoustic muffler.

Although the tube 27 illustrated is obtained in a separate piece from the median wall 26, it should be understood that said tube may be provided in a single piece with said median wall.

It should also be understood that the median wall 26 may be located in different positions, not necessarily horizontal or substantially horizontal, and it may even be arranged in a substantially vertical or inclined manner. Furthermore, the first and the second discharge chambers C1, C2, may present equal or different volumes and also communicate with each other by more than one opening 26a or more than one tube 27.

The first discharge chamber C1 receives, from the inlet nozzle 22 of the hollow body 20, the entire discharge flow coming from the compression chamber C, said first discharge chamber C1 maintaining a constant fluid communication with the second discharge chamber C2, through the tube 27.

Said hollow body construction presenting two discharge chambers interconnected by a tube 27 provides, to the discharge system, an acoustic muffling function, of the volume-tube-volume type, in the interior of the cylinder cap 10. Thus, the discharge system of the present invention also acts as an acoustic muffler during the gas discharge in the gas compression upon operation of the compressor and also as an enhancer of the mass efficiency of the latter.

The volume of each of the first and second discharge chambers C1, C2, as well as the determination of the dimensions of each tube 27 (length, shape, cross section) and the definition of the extension thereof projecting to the inside of each chamber in which said tube acts, are defined as a function of the thermal insulation effect to be achieved, however they can be also defined as a function of the attenuation to be achieved and of the pulsation range to be attenuated.

According to the present invention, the hollow body 20 may further present a plurality of discharge chambers located according to the same concept described for the two discharge chambers illustrated in the drawings.

According to a way of carrying out the present invention, the tube 27 presents a first end 27c and a second end 27d which are eccentrically disposed in the first and second discharge chambers C1, C2, the first end 27c of the tube 27 being located eccentrically to the inlet nozzle 22 of the hollow body 20, and the second end 27d of the tube 27 being located spaced from the gas outlet nozzle 23 of the hollow body 20. On its turn, the gas outlet nozzle 23 is located in direct fluid communication with the gas outlet 13 of the cylinder cap 10. In the particular construction illustrated, the gas outlet nozzle 22 is located orthogonal to the gas outlet 13 of the cylinder cap 10 and connected to said gas outlet 13 by means of the tubular passage 16 provided in the end wall 14 of the cylinder cap 10.

Although the illustrated tube 27 is obtained in a separate piece from the median wall 26, it should be understood that said tube may be provided in a single piece with said median wall.

The maintenance of the seating of the base end wall 24 against the valve plate 3 is assured by the biasing means 40, allowing the base opening 22a of the inlet nozzle 22 to operate as a securing means for the discharge valves 4 and as a limiting means (stop) for the maximum opening of the latter.

The tubular configuration of the inlet nozzle 22, projecting to the interior of the hollow body 20, by means of the tubular conduit 22b, allows the flow of refrigerant gas being compressed inside cylinder 2 to be accelerated inside said tubular projection 22, thus producing an instantaneous reduction in the pressure inside the cylinder 2, which pressure rises once again upon the approximation of the piston towards the valve plate 3.

The instantaneous pressure drop inside the cylinder 2, upon the opening of the discharge valve 4, reduces the power loss in the discharge system, thus increasing the efficiency of the compressor. Furthermore, said instantaneous pressure drop allows reducing the pressure transients upstream and downstream of the discharge valve, at the moment the latter opens, reducing the intensity of the pulsations caused by operation of the discharge valve.

Another important positive aspect of the proposed technical solution derives from the fact of preventing the direct contact between the compressed gas entering into the plenum 21 of the hollow body 20 and the valve plate 3, reducing the thermal exchange in the region of the cylinder cap 10.

It should be understood that the present technical solution may be employed even if variations occur in the following aspects: type of compressor mechanism; geometric parameters of the accelerating means AM (inlet and outlet diameter and length); shape of the accelerating means (tapered, cylindrical, etc.); and quantity of discharge chambers C1, C2.

Furthermore, the proposed solution allows the usual stop of the discharge valve, which is responsible for the fixation of the latter and for limiting its maximum opening, to be defined by the base end wall 24 itself.

As described an illustrated, the present discharge system, besides leading to effective power gains, by reducing the pressure transients, as well as gains in the pumping mass of the refrigerant gas, further allows for, upon using the hollow body 20 preferably in a thermal insulating material, a substantially increased thermal insulation between the compressed gas contained in the interior of the hollow body 20 and the environment internal to the compressor housing, in relation to the discharge systems known in the state of the art.

It should be further noted that the constructive variations described herein may be presented individually in particular constructions, or also partially or totally combined with each other.

The invention claimed is:

1. A gas discharge system for a refrigeration compressor of the type which comprises: a cylinder crankcase defining a cylinder which is closed, at one end, by a valve plate provided with at least one discharge orifice and defining, with the cylinder, one compression chamber; a cylinder cap having a gas outlet and being seated against the valve plate in opposition to the compression chamber and in whose interior is defined a discharge chamber, the valve plate being operationally associated with at least one discharge valve, said system being characterized in that it comprises an accelerating means mounted in an interior of the discharge chamber and secured to at least one of the parts of cylinder cap and the valve plate, the accelerating means positioned to receive an entire flow of refrigerant gas released by the discharge valve through the discharge orifice, the accelerating means configured to accelerate said refrigerant gas flow by providing an inlet nozzle having a base opening open to and larger than the discharge orifice communicating said discharge orifice with the discharge chamber and a tubular conduit defining an opening larger than the base opening and causing an instantaneous reduction in a pressure gradient between an upstream and a downstream side of the discharge valve, in a moment the latter opens; wherein the cylinder cap further comprises a base end wall seated against the valve plate; in which the discharge valve comprises at least one flexible blade, in that the base end wall comprises an annular region, defined around the base opening of the inlet nozzle and defining a stop for the maximum opening of the flexible blade of the discharge valve, wherein a portion of the base end wall retains the discharge valve in its position in the valve plate; wherein the annular region of the base wall is inclined radially inwards and axially inwards in the interior of the discharge chamber, defining an inclined opening stop, against which is seated the flexible blade upon a maximum opening of the discharge valve.

2. The system, as set forth in claim 1, characterized in that the tubular conduit has a cylindrical or inverted frusto-conical shape which projects to the interior of the discharge chamber, from the discharge orifice of the valve plate.

3. The system, as set forth in claim 2, provided with the inlet nozzle comprising the base opening, open to the discharge orifice of the valve plate and said tubular conduit being incorporated, in a single piece, to the base end wall and defining an extension of the inlet nozzle to the interior of the discharge chamber.

4. The system, as set forth in claim 3, characterized in that said annular region of the base end wall, which acts against the flexible blade of the discharge valve is constructed in order to be axially spaced from the valve plate, defining an opening stop for the flexible blade of the discharge valve.

5. The system, as set forth in claim 3, further comprising a hollow body defining at least one plenum therein and which is mounted, in an indexed manner, in the interior of the cylinder cap, maintaining with the latter a gap, said hollow body comprising the base end wall preventing the direct contact of the valve plate with the inner volume of the hollow body, the inlet nozzle of the base end wall communicating the plenum with the discharge orifice of the valve plate.

6. The system, as set forth in claim 5, characterized in that the hollow body is formed in two parts, wherein one of the two parts incorporates the base end wall and the other of the two parts incorporates the top end wall, said two parts being seated against a common dividing wall which divides the plenum of the hollow body into a first and a second discharge chamber, said dividing wall presenting at least one opening communicating both discharge chambers.

7. The system, as set forth in claim 6, characterized in that the opening of the dividing wall comprises at least one tube projecting to the interior of the first discharge chamber, through a straight section eccentric in relation to the inlet nozzle, and to the interior of the second discharge chamber, through an arcuate section defining an acoustic muffler.

8. The system, as set forth in claim 1, in which the cylinder cap is provided with an end wall opposite to the valve plate, said system being characterized in that a hollow body comprises a top end wall in which is provided an outlet nozzle of the hollow body, said outlet nozzle being open to the gas outlet of the cylinder cap.

9. The system, as set forth in claim 8, characterized in that the outlet nozzle of the hollow body comprises an outer tubular projection provided in the top end wall of the hollow body, in order to be fitted in a tubular passage formed internally to the end wall and which is open to the outlet nozzle of the cylinder cap.

10. The system, as set forth in claim 9, characterized in that the outer tubular projection extends to the outside of a lowered region provided on the top end wall of the hollow body.

11. The system, as set forth in claim 8, characterized in that it comprises a plate spring, located between the top end wall and the end wall of the cylinder cap and elastically forcing the hollow body against the valve plate.

12. The system, as set forth in claim 11, characterized in that the top end wall incorporates a plurality of top projections facing outside the hollow body, the plate spring presenting opposite ends, each being fitted into a respective top projection of the top end wall of the hollow body.

13. A gas discharge system for a refrigeration compressor of the type which comprises: a cylinder crankcase defining a cylinder which is closed, at one end, by a valve plate provided with at least one discharge orifice and defining, with the cylinder, one compression chamber; a cylinder cap having a gas outlet and being seated against the valve plate in opposition to the compression chamber and in whose interior is defined a discharge chamber, the valve plate being operationally associated with at least one discharge valve, said system being characterized in that it comprises an accelerating means mounted in an interior of the discharge chamber and secured to at least one of the parts of cylinder cap and the valve plate, the accelerating means positioned to receive an entire flow of refrigerant gas released by the discharge valve through the discharge orifice, the accelerating means configured to accelerate said refrigerant gas flow by providing an inlet nozzle having a base opening open to and larger than the discharge orifice communicating said discharge orifice with the discharge chamber and a tubular conduit defining an opening larger than the base opening and causing an instantaneous reduction in a pressure gradient between an upstream and a downstream side of the discharge valve, in a moment the latter opens; wherein the cylinder cap further comprises a base end wall seated against the valve plate; in which the discharge valve comprises at least one flexible blade, in that the base end wall comprises an annular region, defined around the base opening of the inlet nozzle and defining a stop for the maximum opening of the flexible blade of the discharge valve, wherein a portion of the base end wall retains the discharge valve in its position in the valve plate; wherein the annular region of the base wall is inclined radially inwards and axially inwards in the interior of the discharge chamber, defining an inclined opening stop, against which is seated the flexible blade upon a maximum opening of the discharge valve;

wherein the tubular conduit has a cylindrical or inverted frusta-conical shape which projects to the interior of the discharge chamber, from the discharge orifice of the valve plate;

wherein the inlet nozzle comprises the base opening, open to the discharge orifice of the valve plate and said tubular conduit being incorporated, in a single piece, to the base end wall and defining an extension of the inlet nozzle to the interior of the discharge chamber; and     wherein the annular region of the base end wall, which acts against the flexible blade of the discharge valve, is constructed in order to be axially spaced from the valve plate, defining an opening stop for the flexible blade of the discharge valve.

14. A gas discharge system for a refrigeration compressor of the type which comprises: a cylinder crankcase defining a cylinder which is closed, at one end, by a valve plate provided with at least one discharge orifice and defining, with the cylinder, one compression chamber; a cylinder cap having a gas outlet and being seated against the valve plate in opposition to the compression chamber and in whose interior is defined a discharge chamber, the valve plate being operationally associated with at least one discharge valve, said system being characterized in that it comprises an accelerating means mounted in an interior of the discharge chamber and secured to at least one of the parts of cylinder cap and the valve plate, the accelerating means positioned to receive an entire flow of refrigerant gas released by the discharge valve through the discharge orifice, the accelerating means configured to accelerate said refrigerant gas flow by providing an inlet nozzle having a base opening open to and larger than the discharge orifice communicating said discharge orifice with the discharge chamber and a tubular conduit defining an opening larger than the base opening and causing an instantaneous reduction in a pressure gradient between an upstream and a downstream side of the discharge valve, in a moment the latter opens; wherein the cylinder cap further comprises a base end wall seated against the valve plate; in which the discharge valve comprises at least one flexible blade, in that the base end wall comprises an annular region, defined around the base opening of the inlet nozzle and defining a stop for the maximum opening of the flexible blade of the discharge valve, wherein a portion of the base end wall retains the discharge valve in its position in the valve plate; wherein the annular region of the base wall is inclined radially inwards and axially inwards in the interior of the discharge chamber, defining an inclined opening stop, against which is seated the flexible blade upon a maximum opening of the discharge valve;

wherein the cylinder cap is provided with an end wall opposite to the valve plate, said system being characterized in that a hollow body comprises a top end wall in which is provided an outlet nozzle of the hollow body, said outlet nozzle being open to the gas outlet of the cylinder cap;

wherein the system comprises a plate spring located between the top end wall and the end wall of the cylinder cap and elastically forcing the hollow body against the valve plate; and wherein the top end wall incorporates a plurality of top projections facing outside the hollow body, the plate spring presenting opposite ends, each being fitted into a respective top projection of the top end wall of the hollow body.

* * * * *